Sept. 27, 1966  R. D. BAUER  3,275,707
POLYMERIZATION OF OLEFINS
Filed Jan. 3, 1964
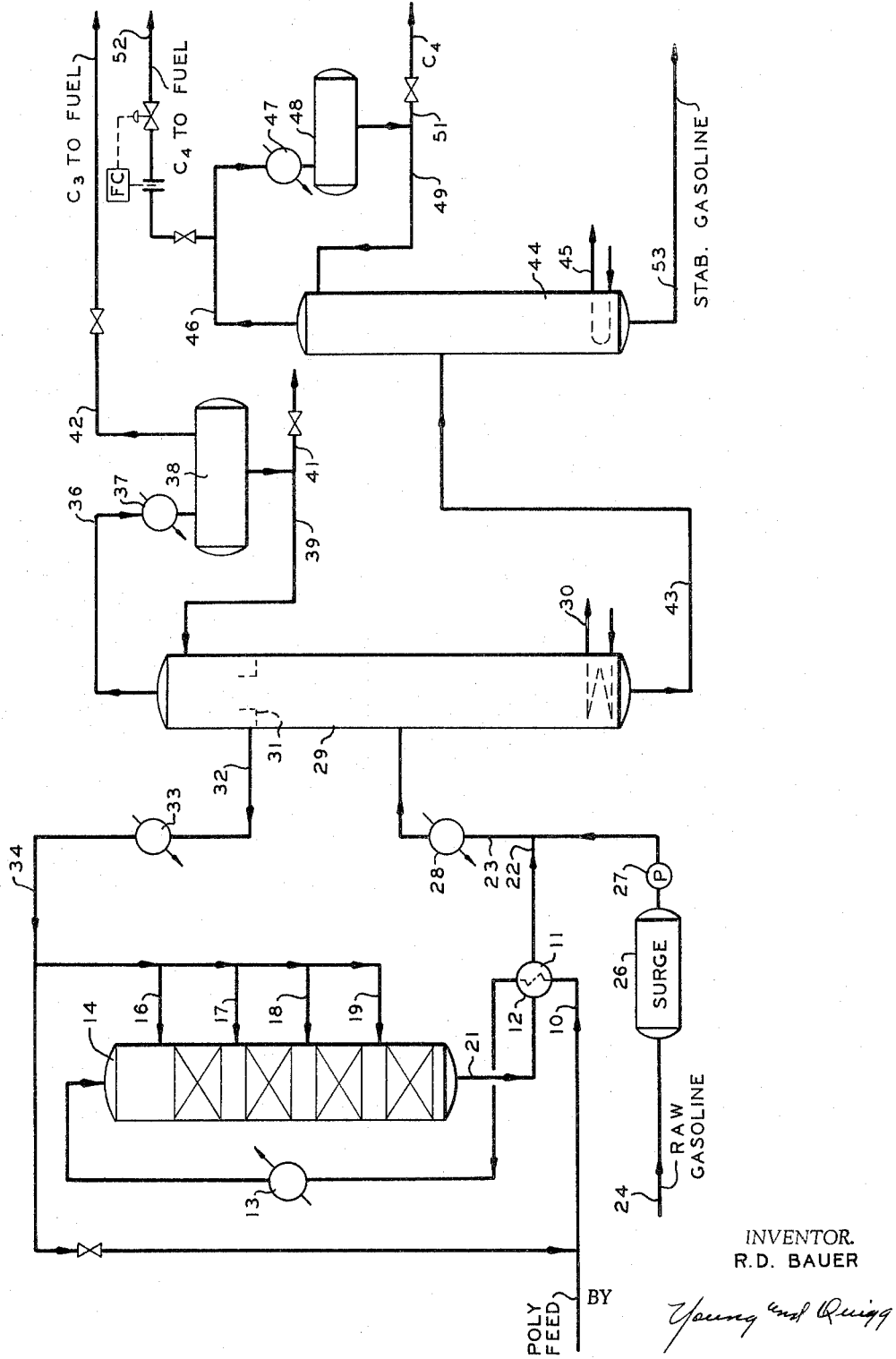
INVENTOR.
R.D. BAUER
BY
Young and Quigg
ATTORNEYS United States Patent Office 3,275,707
Patented Sept. 27, 1966

3,275,707
POLYMERIZATION OF OLEFINS
Robert D. Bauer, Bartlesville, Okla., assignor to Phillips Petroleum Company, a corporation of Delaware
Filed Jan. 3, 1964, Ser. No. 335,472
6 Claims. (Cl. 260—683.15)

This invention relates to the polymerization of olefins. In one aspect this invention relates to the polymerization of olefins in the absence of free oxygen. In another aspect this invention relates to a combination polymerization and gasoline stabilization process.

Low-boiling olefins such as those containing from 3 to 5 carbon atoms per molecule can be effectively polymerized in the presence of various catalysts to produce dimers, trimers, tetramers, etc. which can then be hydrogenated to produce valuable components of high antiknock gasolines. Mixtures of said olefins can be polymerized to produce a full-boiling motor polymer which is useful without hydrogenation as a valuable component of motor fuels. A major difficulty in such processes is maintaining catalyst activity and/or life. Catalysts such as the well known solid phosphoric acid catalysts gradually decrease in activity during use due to "fouling" or poisoning, or to physical and chemical changes, or both. Free oxygen contained in the feed stream and/or recycle stream to the polymerization reactor is one source of catalyst poison or fouling agent.

Steps can be taken to eliminate free oxygen from said feed and/or recycle streams by treating same with a suitable oxygen absorbing material under conditions to remove the free oxygen. However, such treating processess complicate and increase the cost of operation of the polymerization process. In a polymerization process such as described above the reactor effluent is fractionated to remove the polymer or polymers therefrom. In such processes it is common practice to return an overhead stream from the fractionation as a recycle stream to the polymerization reactor to polymerize unsaturated olefins contained in said recycle stream and to also furnish a coolant or diluent stream to aid in controlling the exothermic polymerization reaction. This practice aggravates the above-described catalyst poisoning or fouling problems because any oxygen in the system will be concentrated in such overhead streams.

Fractionation of the polymerization reactor effluent presents other problems, particularly to the small refiner. In small refineries where the catalytic polymerization unit is necessarily small, it would be desirable to combine the fractionation equipment for the polymerization reactor effluent with other gasoline or hydrocarbon stream fractionation (stabilization) equipment so as to reduce investment and operating costs. However, this cannot be done when operating according to the methods of the prior art because the other gasoline or hydrocarbon streams nearly always contain at least some dissolved and/or entrained free oxygen. Said oxygen is concentrated in the overhead stream from said fractionation and recycled to the polymerization reactor and further aggravates the problems of maintaining catalyst activity and/or life.

The present invention provides a solution to the above-described problems. Broadly speaking, the present invention provides a combination polymerization and hydrocarbon stabilization process wherein a gasoline stream to be stabilized is combined with the polymerization reactor effluent, the combined stream is fractionated and stabilized, and an essentially oxygen-free side stream is removed from said fractionation and returned to the polymerization reactor as a diluent and coolant stream. By thus operating in accordance with the invention substantial increases in catalyst activity and/or life are obtained, and substantial over-all economies in investment and operating costs are realized.

An object of this invention is to provide an improved process for the polymerization of olefins. Another object of this invention is to provide a process for polymerizing olefins in the absence of free oxygen. Another object of this invention is to provide a combined process for the polymerization of olefins and the stabilization of a gasoline or other hydrocarbon stream. Another object of this invention is to provide a combination of apparatus for polymerizing olefins in the absence of free oxygen and stabilizing an outside gasoline or other hydrocarbon stream. Other aspects, objects, and advantages of the invention will be apparent to those skilled in the art in view of this disclosure.

Thus, according to the invention, there is provided a combination polymerization and hydrocarbon stream stabilization process, comprising: introducing an olefin-containing hydrocarbon feed stock into a polymerization zone; introducing a coolant and diluent stream comprising a saturated hydrocarbon into said polymerization zone; withdrawing reaction mixture from said polymerization zone; combining said reaction mixture with a stream of unstabilized mixed hydrocarbons containing saturated hydrocarbons; introducing said combined stream into a fractionation zone at a point intermediate the ends thereof; withdrawing an essentially oxygen-free side stream comprising said saturated hydrocarbon from an upper portion of said fractionation zone; and passing at least a portion of said side stream into said polymerization zone as said coolant stream.

Further according to the invention, there is provided a combination of apparatus for catalytically polymerizing olefins in the absence of free oxygen and stabilizing an outside gasoline stream along with the polymerization reactor effluent to provide an essentially oxygen-free recycle and coolant stream which is utilized in the polymerization reactor.

Referring now to the drawing, the invention will be more fully explained. Said drawing is a schematic flow sheet illustrating various embodiments of the invention. It will be understood that many valves, pumps, flow control instruments, etc., have been omitted from said drawing for the sake of brevity because they are not necessary in explaining the invention to those skilled in the art. In said drawing a stream of olefin-containing hydrocarbon poly feed stock, previously water washed in means not shown, is passed through conduit 10, heat exchanger 11, conduit 12, feed preheater 13, and introduced into the top or upper portion of polymerization reactor 14. In said polymerization reactor said feed stock contacts a bed of suitable polymerization catalyst such as phosphoric acid on a suitable support. Said catalyst bed can be one continuous bed or is preferably divided into a plurality of beds as shown. While said catalyst beds are here shown as being equal in size, it is within the scope of the invention to vary the volume or size of the individual catalyst beds. The polymerization reaction which takes place in highly exothermic and it is necessary to remove the heat evolved during the reaction in order to avoid undesirable side reactions. One presently preferred method for removing said heat of reaction is to introduce an inert diluent or coolant liquid into said catalyst bed at spaced intermediate points thereof. When employing a catalyst bed comprising a plurality of beds as shown in said drawing, this can be done by introducing said coolant between said beds, as by means of the conduits 16, 17, 18, and 19. The amount of said coolant and diluent stream introduced through each of said conduits 16, 17, 18, and 19 is controlled by means of valves (not shown)

in said conduits so as to maintain a substantially uniform temperature throughout the catalyst bed.

The reaction mixture, comprising polymer, some unreacted olefin, and saturated hydrocarbons, is withdrawn from reactor 14 via conduit 21, passed in heat exchange with said raw poly feed stock in heat exchanger 11, and then passed via conduit 22 into conduit 23.

An unstabilized gasoline stream, such as a light straight run gasoline fractionated from crude oil, is passed via conduit 24, surge tank 26, pump 27, and into conduit 23 wherein it is mixed with the polymerization reaction mixture from conduit 22. Said unstabilized gasoline has been previously caustic washed to remove $H_2S$ and then extracted in a Merox unit, not shown, to remove mercaptans. Said Merox unit comprises means for contacting the hydrocarbon stream with caustic containing a catalyst, such as cobalt phthalocyanine, in the presence of air. This treatment results in appreciable quantities of dissolved and/or entrained air (free $O_2$) being picked up by the gasoline. Further details concerning said Merox process can be found in Petroleum Refiner 39, No. 9, page 271 (September 1960).

Said combined stream in conduit 23 is passed through cooler 28 for temperature adjustment and introduced into fractionator 29 at a point intermediate the ends thereof. If necessary or desirable, it is within the scope of the invention to employ a heater instead of cooler 28 for said temperature adjustment.

In said fractionator 29, an essentially oxygen-free side stream comprising a low-boiling hydrocarbon such as propane and some unreacted olefin is collected on donut or collector tray 31, withdrawn via conduit 32, passed through cooler 33 and into conduit 34 from which at least a portion thereof is utilized as said diluent or coolant liquid introduced via the header conduit shown and conduits 16, 17, 18, and 19 into reactor 14 as described above. Any remaining portion of said stream in conduit 34 which is not introduced into said reactor via said conduits 16–19 is passed via conduit 35 into said conduit 10 where it is admixed with the fresh poly feed.

An overhead stream comprising a low-boiling saturated hydrocarbon such as propane is withdrawn from said fractionator 29 via conduit 36, passed through condenser 37, and into accumulator 38. A portion of the condensate from said accumulator is passed via conduit 39 to the top of fractionator 29 as reflux therefor. If desired, a portion of said condensate can be removed via conduit 41 as liquefied petroleum gas product. Or, if desired, the portion of said condensate not utilized as reflux can be withdrawn via conduit 42 and passed to fuel gas. A suitable heating means, indicated here by reboiler coil 30, is provided for introduction of sufficient heat into fractionator 39 to maintain fractionation conditions therein.

A bottoms stream comprising partially stabilized gasoline is withdrawn from fractionator 29 via conduit 43 and introduced into fractionator 44 at a point intermediate the ends thereof. An overhead stream comprising predominantly saturated $C_4$ hydrocarbons is withdrawn from said fractionator 44 via conduit 46, passed through condenser 47, and into accumulator 48. A portion of the condensate in accumulator 48 is returned via conduit 49 to the upper portion of fractionator 44 as reflux therefor. Another portion of said condensate is withdrawn via conduit 51 and passed to storage or use as liquefied petroleum gas product. If desired, a portion of the uncondensed overhead stream in conduit 46 can be withdrawn via conduit 52 and passed to fuel gas, the amount so withdrawn being controlled in conventional manner by the flow control system shown. A suitable heating means, indicated here by reboiler coil 45, is provided for introduction of sufficient heat into fractionator 44 to maintain fractionation conditions therein.

A stream of stabilized gasoline is withdrawn from the bottom of fractionator 44 via conduit 53 as product of the process. Said stream of gasoline comprises a mixture of the polymer gasoline produced in reactor 14 and the stabilized portion of the raw gasoline introduced to the system via conduit 24. The gasoline thus produced is referred to as a stabilized gasoline because it has had the $C_3$ and lighter hydrocarbons and substantially all the $C_4$ hydrocarbons fractionated therefrom, thus reducing the vapor pressure (Reid vapor pressure) of the gasoline.

Any suitable catalyst can be employed in the polymerization step of the invention. A presently preferred group of catalysts are the well known solid phosphoric acid catalysts. By solid phosphoric acid catalyst it is intended to include those catalysts comprising phosphoric acid such as an ortho, meta, or pyro phosphoric acid deposited on a suitable solid carrier such as silicates, silica, carbon, charcoal, coke, kieselguhr, and the like. Said catalysts will usually analyze to be about 60 percent by weight $P_2O_5$, based on the total catalyst. It is usually considered that the ortho form ($H_3PO_4$) is the active form and it is usually present in an amount within the range of from 14 to 17, preferably about 15 percent by weight, based on the total catalyst. One presently more preferred catalyst is a commercially available solid phosphoric acid catalyst comprising phosphoric acid deposited on kieselguhr and calcined. Other catalysts which can be employed include the pyrophosphates of copper, mercury, zinc, magnesium, iron, aluminum, and cobalt. The invention is not limited to the use of any particular catalyst and is applicable to protecting or extending the life and/or activity of any polymerization catalyst which is poisoned or fouled by the presence of free oxygen in the streams charged to the polymerization reactor.

While the invention has been described above as employing only one polymerization reactor, it is within the scope of the invention to employ more than one such reactor. Thus, a plurality of polymerization reactors, operated in either series or parallel, can be employed in the practice of the invention.

The invention is not limited to the polymerization of any particular fresh polymerization feed stock. The invention finds one of its greatest applications in polymerizing feed stocks comprising $C_3$ and $C_4$ olefins. However, it is within the scope of the invention to charge polymerization feed stocks containing $C_2$ to $C_6$, or higher, olefins.

The conditions employed in the polymerization reactor will depend upon the particular feed stock charged thereto, as will be understood by those skilled in the art. Thus, the invention is not limited to employing any particular operating conditions in the polymerization reactor. Usually, the operating conditions in said reactor will be within the following ranges: reactor inlet, 300 to 400° F.; reactor outlet, 350 to 500° F.; pressure, 400 to 1000 p.s.i.a.; and liquid hourly space velocity, 0.2 to 0.4 gallon per hour per pound of catalyst.

While the invention has been described above with particular reference to utilizing a light straight run gasoline as the gasoline which is stabilized along with the effluent from the polymerization reactor, the invention is not so limited. Other unstabilized gasoline or hydrocarbon streams such as cracked gasoline, etc. can be utilized in the practice of the invention. As discussed further hereinafter, the utilization of an unstabilized gasoline or other hydrocarbon stream in the combination stabilization step of the invention provides one of the outstanding advantages of said invention. Not only are outstanding economies in investment and operating costs realized, but also, the unstabilized gasoline or hydrocarbon stream is a source of diluent for use as the coolant or diluent stream in the polymerization reactor. The combined stabilization step of the invention thus affords and makes possible great flexibility in the choice of polymerization feed stock.

As will be realized by those skilled in the art, the operating conditions in the various fractionating units employed in the practice of the invention will depend upon the charge streams thereto and separations desired to be effected. Thus, the invention is not limited to any particular number of fractionators or operating conditions employed therein. When employing a two-tower system, such as that illustrated in the drawing and described above, the operating conditions will usually be in the following ranges: depropanizer top temperature, 100 to 150° F.; depropanizer bottom temperature, 250 to 350° F.; depropanizer top pressure, 215 to 315 p.s.i.a; debutanizer top temperature, 100 to 150° F.; debutanizer bottom temperature, 250 to 350° F.; and debutanizer top pressure, 75 to 150 p.s.i.a.

While the invention has been described above with reference to utilizing an unstabilized gasoline which has been Merox treated, the invention is not so limited. It is within the scope of the invention to utilize an outside gasoline or other hydrocarbon stream which has been sweetened or otherwise treated by any process which results in free oxygen being present in the gasoline or hydrocarbon streams. For example, such streams which have been copper sweetened frequently contain objectionable amounts of free oxygen. It sometimes happens that gasoline or other hydrocarbon streams can pick up sufficient dissolved and/or entrained oxygen from sources other than a sweetening or other treating step. For example, leaking packing glands in transfer pumps will sometimes introduce sufficient free oxygen to be detrimental. Thus, the invention is applicable to extending the life and/or activity of a polymerization catalyst by protecting same from the effects of dissolved and/or entrained free oxygen from any source and contained in the hydrocarbon stream or streams charged to the polymerization reactor.

The following examples will serve to further illustrate the invention.

EXAMPLE

A stream of polymerization feed stock comprising $C_3$ and $C_4$ olefins is introduced via conduit 10 and passed into a polymerization zone 14 as illustrated in the drawing. A stream of light straight run gasoline (fractionated from a crude oil) which has been previously sweetened in a Merox treater and contains 9 parts by weight of free oxygen per million parts by weights of gasoline, is introduced via conduit 24 and mixed in conduit 23 with the effluent from polymerization zone 14. Said combined stream is then stabilized with essentially all of said free oxygen being removed overhead from fractionator 29 to give a free oxygen content in overhead stream 42 of 59 parts by weight per million parts by weight of said overhead stream. The entire operation is essentially as illustrated in the drawing and as described above. Specific operating conditions in the various units of the system are as follows:

Polymerization reactor inlet temperature, ° F. ____ 400
Polymerization reactor outlet temperature, ° F. ____ 400
Polymerization reactor pressure, p.s.i.a. _____ 800
Polymerization reactor LHSV, gal./hr./lb. catalyst __ 0.3
Depropanizer top temperature, ° F. _____ 120
Depropanizer bottom temperature, ° F. _____ 298
Depropanizer top pressure, p.s.i.a. _____ 250
Debutanizer top temperature, ° F. _____ 121
Debutanizer bottom temperature, ° F. _____ 281
Debutanizer top pressure, p.s.i.a. _____ 85

Further details of the operation, including charge rates, stream compositions, etc. are set forth in Table I below.

TABLE I

| Component LV% [4] | Stream Number | | | | | | | | | |
|---|---|---|---|---|---|---|---|---|---|---|
| | 10 | 24 | 35 | 16-19 | 21 | 23 | 42 | 43 | 46 | 53 |
| | Fresh Poly Feed | Unstabilized Gasoline Feed | Recycle to Poly Feed | Recycle to Reactor | Reactor Effluent | Charge to DeC$_3$ | DeC$_3$ O'H'D (Fuel) | DeC$_3$ Bottoms (to DeC$_4$) | DeC$_4$ O'H'D (Total) | DeC$_4$ Btm. (Gaso.) |
| Ethane | 0.2 | | (T) | (T) | 0.1 | 0.1 | 1.1 | | | |
| Propylene | 27.9 | | 8.2 | 8.2 | 6.5 | 4.8 | 11.8 | (T) | (T) | |
| Propane | 2.8 | 14.0 | 88.5 | 88.5 | 64.4 | 51.1 | 86.3 | 0.5 | 1.8 | |
| Iso Butane | 27.1 | 4.5 | 2.9 | 2.9 | 10.9 | 9.1 | 0.8 | 17.8 | 60.5 | 0.4 |
| Butenes | 32.3 | | (T) | (T) | 0.5 | 0.4 | (T) | 0.9 | 3.0 | (T) |
| Normal Butane | 9.0 | 8.9 | 0.4 | 0.4 | 3.2 | 4.7 | (T) | 10.7 | 34.2 | 1.1 |
| Isopentane Plus [2] | 0.7 | 72.6 | | | 14.4 | 29.8 | | 70.1 | 0.5 | 98.5 |
| Total | 100.0 | 100.0 | 100.0 | 100.0 | 100.0 | 100.0 | 100.0 | 100.0 | 100.0 | 100.0 |
| Barrels/Day | 424 | 471 | 594 | [1] 347 | 1,311 | 1,782 | [3] 342.4 | 757 | 220 | 537 |
| Gravity, API° 60/60° F | | | 145.8 | 145.8 | | 114.4 | | 81.7 | 116.6 | 70.1 |
| Octane No. [5] | | 80 | | | | | | | | 89.7 |

(T) = Trace only.

[1] Added to Reactor at 4 points.
[2] Stabilized gasoline.
[3] Mols/Day.
[4] All composition figures given in liquid volume percent (LV%) except stream 42 which is given in mole percent.
[5] Research method, plus 3 cc. tetraethyl lead.

Examination of the composition of streams 10 and 24 in the above Table I shows that the greater part of the propane in recycle streams 16-19 and 21 comes from the unstabilized gasoline stream 24. This affords greater flexibility in selecting charge streams such as stream 10. Thus, one can choose poly feed charge streams (stream 10) substantially independent of any requirements for recycle diluent and coolant contained therein.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A combination polymerization and hydrocarbon stream stabilization process, comprising: introducing an olefin-containing hydrocarbon feed stock comprising $C_2$ to $C_6$ olefins into a polymerization zone; in said polymerization zone, contacting said feedstock with a polymerization catalyst active for catalyzing polymerization of said olefins to polymers boiling within the gasoline range and which is subject to being deactivated upon contact with free oxygen; introducing a coolant and diluent stream comprising a saturated hydrocarbon into said polymerization zone; withdrawing reaction mixture from said polymerization zone; combining said reaction mixture with a stream of unstabilized mixed hydrocarbons containing free oxygen and saturated hydrocarbons; introducing said combined stream into a fractionation zone at a point intermediate the ends thereof; withdrawing an essentially oxygen-free side stream comprising said saturated hydrocarbon from an upper portion of said fractionation zone; and passing at least a portion of said side stream into said polymerization zone as said coolant stream.

2. A combination polymerization and hydrocarbon stream stabilization process, comprising: introducing a hydrocarbon feed stock comprising $C_2$ to $C_6$ olefins into a polymerization zone in said polymerization zone, passing said feed stock through a catalyst bed active for polymerizing said olefins to polymers boiling within the gasoline range and which is subject to being deactivated upon contact with free oxygen, introducing a coolant and diluent stream comprising saturated $C_3$ hydrocarbons into said polymerization zone; withdrawing reaction mixture from said polymerization zone; combining said reaction mixture with a stream of unstabilized mixed hydrocarbons containing free oxygen and saturated $C_3$ hydrocarbons; introducing said combined stream into a fractionation zone at a point intermediate the ends thereof; withdrawing an essentially oxygen-free side stream comprising said $C_3$ hydrocarbons from an upper portion of said fractionation zone; and passing at least a portion of said side stream into said polymerization zone as said coolant and diluent stream.

3. A combination polymerization and gasoline stabilization process, comprising: introducing a hydrocarbon feed stock comprising $C_3$ to $C_5$ olefins into a polymerization zone in said polymerization zone, passing said feed stock through a catalyst bed active for polymerizing said olefins to polymers boiling within the gasoline range and which is subject to being deactivated upon contact with free oxygen; introducing a coolant and diluent stream comprising propane into said polymerization zone at a plurality of spaced apart points in said catalyst bed therein; withdrawing reaction mixture from said polymerization zone; combining said reaction mixture with a stream of propane-containing unstabilized gasoline which also contains free oxygen; introducing said combined stream into a fractionation zone at a point intermediate the ends thereof; withdrawing an essentially oxygen-free side stream comprising propane from an upper portion of said fractionation zone; and passing at least a portion of said side stream into said polymerization zone as said coolant and diluent stream.

4. A combination polymerization and gasoline stabilization process, comprising: introducing a hydrocarbon feed stock comprising $C_3$ to $C_5$ olefins into a polymerization zone in said polymerization zone, passing said feed stock through a catalyst bed active for polymerizing said olefins to polymers boiling within the gasoline range and which is subject to being deactivated upon contact with free oxygen; introducing a coolant and diluent stream comprising propane into said polymerization zone at a plurality of spaced apart points in said catalyst bed therein; withdrawing reaction mixture from said polymerization zone; combining said reaction mixture with a stream of propane-containing unstabilized gasoline which also contains free oxygen; introducing said combined stream into a first fractionation zone at a point intermediate the ends thereof; withdrawing an essentially oxygen-free side stream comprising propane from an upper portion of said first fractionation zone at a point above said point of introduction of said combined stream; passing at least a portion of said side stream into said polymerization zone as said coolant and diluent stream; withdrawing bottoms product from said first fractionation zone; introducing said bottoms product into a second fractionation zone; and withdrawing a stabilized gasoline, including polymer gasoline from said polymerization zone, as bottoms product from said second fractionation zone.

5. A combination polymerization and gasoline stabilization process, comprising: introducing a hydrocarbon feed stock comprising $C_3$ and $C_4$ olefins into a polymerization zone in said polymerization zone, passing said feed stock through a catalyst bed active for polymerizing said olefins to polymers boiling within the gasoline range and which is subject to being deactivated upon contact with free oxygen; introducing a coolant and diluent stream comprising propane into said polymerization zone at a plurality of spaced apart points in said catalyst bed therein; withdrawing reaction mixture from said polymerization zone; combining said reaction mixture with a stream of propane-containing unstabilized gasoline which also contains free oxygen; introducing said combined stream into a first fractionation zone at a point intermediate the ends thereof; withdrawing an essentially oxygen-free side stream comprising propane from an upper portion of said first fractionation zone at a point above said point of introduction of said combined stream; passing a portion of said side stream into said polymerization zone as said coolant and diluent stream; passing another portion of said side stream into said polymerization zone in admixture with said hydrocarbon feed stock stream; withdrawing bottoms product from said first fractionation zone; introducing said bottoms product into a second fractionation zone; and withdrawing a stabilized gasoline, including polymer gasoline from said polymerization zone, as bottoms product from said second fractionation zone.

6. A combination polymerization and gasoline stabilization process, comprising: introducing a hydrocarbon feed stock comprising $C_3$ to $C_5$ olefins into a polymerization zone; in said polymerization zone, contacting said feed stock with a solid phosphoric acid polymerization catalyst at a temperature within the range of from 300 to 500° F., a pressure within the range of from 400 to 1000 p.s.i.a., and a liquid hourly space velocity within the range of from 0.2 to 0.4 gallon per hour per pound of said catalyst; introducing a coolant and diluent stream comprising propane into said polymerization zone at a plurality of spaced apart points in said catalyst bed in amounts sufficient to maintain a substantially uniform temperature throughout said bed; withdrawing reaction mixture, including polymer gasoline, from said polymerization zone; combining said withdrawn reaction mixture with a stream of propane-containing unstabilized gasoline which also contains free oxygen; introducing said combined stream into a first fractionation zone at a point intermediate the ends thereof; withdrawing an essentially oxygen-free side stream comprising propane from an upper portion of said first fractionation zone at a point above said point of introduction of said combined stream; passing a portion of said side stream into said polymerization zone as said coolant and diluent stream; passing another portion of said side stream into said polymerization zone in admixture with said hydrocarbon feed stock stream; withdrawing bottoms product from said first fractionation zone; introducing said bottoms product into a second fractionation zone; and withdrawing a stabilized gasoline, including polymer gasoline from said polymerization zone, as bottoms product from said second fractionation zone.

References Cited by the Examiner

UNITED STATES PATENTS

| | | | |
|---|---|---|---|
| 2,414,328 | 1/1947 | Pinkerton | 260—683.15 |
| 2,543,838 | 3/1951 | Ernst | 260—683.15 |
| 2,745,890 | 5/1956 | Cahn | 260—683.15 |

OTHER REFERENCES

Modern Petroleum Technology, 3rd Edition, The Institute of Petroleum, London, 1962, pages 224–225 and 397–398.

DELBERT E. GANTZ, *Primary Examiner.*

R. H. SHUBERT, *Assistant Examiner.*

UNITED STATES PATENT OFFICE
CERTIFICATE OF CORRECTION

Patent No. 3,275,707                          September 27, 1966

Robert D. Bauer

It is hereby certified that error appears in the above numbered patent requiring correction and that the said Letters Patent should read as corrected below.

Column 7, lines 6, 26 and 46, and column 8, line 1, after "zone", first occurrence, each occurrence, insert -- a semicolon --.

Signed and sealed this 12th day of September 1967.

(SEAL)
Attest:

ERNEST W. SWIDER                          EDWARD J. BRENNER
Attesting Officer                            Commissioner of Patents